United States Patent [19]

Verrier et al.

[11] Patent Number: 5,254,989
[45] Date of Patent: Oct. 19, 1993

[54] GARBLING THE IDENTIFICATION OF A KEY OF A NON-CODED KEYBOARD, AND CIRCUIT FOR PERFORMING THE METHOD

[75] Inventors: Philippe Verrier, Le Port Marly; Roger Poulenard, Le Pecq; Hartmut Fink, St Nom La Breteche, all of France

[73] Assignee: Bull S.A., Paris, France

[21] Appl. No.: 728,050

[22] Filed: Jul. 8, 1991

Related U.S. Application Data

[63] Continuation of Ser. No. 452,262, Dec. 18, 1989, abandoned.

[30] Foreign Application Priority Data

Dec. 20, 1988 [FR] France ................ 8816786

[51] Int. Cl.⁵ .......................................... H03M 11/20
[52] U.S. Cl. ....................................... 341/26; 341/22; 380/46
[58] Field of Search ............................ 341/22, 26, 27; 340/825.79; 178/17 C; 380/44, 46

[56] References Cited

U.S. PATENT DOCUMENTS

| | | | |
|---|---|---|---|
| 4,262,333 | 4/1981 | Horigome et al. | 341/22 |
| 4,405,917 | 9/1983 | Chai | 341/26 |
| 4,599,608 | 7/1986 | Matsuoka | 341/26 |
| 4,918,445 | 4/1990 | Bower | 341/26 |
| 4,926,173 | 5/1990 | Frielink | 341/26 |
| 5,025,255 | 6/1991 | Mould | 341/26 |
| 5,059,975 | 10/1991 | Nakatsuka | 341/26 |

FOREIGN PATENT DOCUMENTS

| | | |
|---|---|---|
| 0168861 | 1/1986 | European Pat. Off. |
| 2190775 | 11/1987 | United Kingdom |
| 8404614 | 11/1984 | World Int. Prop. O. |

OTHER PUBLICATIONS

IBM Technical Disclosure Bulletin, vol. 25, No. 11A, Apr. 1983, pp. 5777-5778, New York, U.S.; P. Jeanniot et al., "Low-Cost Keyboard Scanner".

*Primary Examiner*—Donald J. Yusko
*Assistant Examiner*—Michael Horabik
*Attorney, Agent, or Firm*—Kerkam, Stowell, Kondracki & Clarke

[57] ABSTRACT

A garbling method for 9 non-coded matrix keyboard, and the circuit for performing the method. includes
  a) connecting at the output each row and column of the keyboard to the outputs of a first register (160) of a parallel input-output interface (16), via a circuit (163, 166, 164);
  b) connecting each row and column of the keyboard to the individual inputs of a second register (162) of the input-output interface;
  c) randomly setting the order in which the outputs of the first register will be scanned;
  d) setting at least one of the outputs of the first register at "1" and checking whether one of the corresponding inputs of the second register is at "1";
  e) if not, scanning the remaining lines one by one by placing them each at "1" until the associated input is at the value "1";
  f) repeating steps d) and e) to determine the column or row respectively, corresponding to the key of the keyboard that has been depressed.

7 Claims, 6 Drawing Sheets

GARBLING THE IDENTIFICATION OF A KEY OF A NON-CODED KEYBOARD, AND CIRCUIT FOR PERFORMING THE METHOD

This is a continuation of application Ser. No. 452,262, filed Dec. 18, 1989 now abandoned.

FIELD OF THE INVENTION

The present invention relates to a method for garbling the identification of a key of a non-coded keyboard, and circuit for performing the method.

BACKGROUND OF THE INVENTION

A method for identifying the keys pressed in a non-coded matrix keyboard, known as line inversion, is known. This method uses a universal parallel input-output interface, in which, as shown in FIG. 6, an eight-bit port is assigned to interfacing of the keyboard by individual input or output programming of the lines of the port. The identification of the keys proceeds in two steps.

In the first step, A, four lines of the universal port, connected to the rows, are output programmed. The four columns are input programmed. The value "0000" is then sent as an output to the port. The result is the input value of "1011". Each time, the true polarities are used, and the 0 corresponds to the position of the column at which a key has been depressed, thus connecting the corresponding column to ground.

In the second step, B, the inputs and outputs are inverted. This inversion can easily be performed by a parallel interface circuit by changing the bits of the data direction register. The initial value of the data direction register was "00001111", and it becomes "11110000". This operation can be done by way of a single instruction requiring supplementation of the contents of the data direction register. The data register itself undergoes no modification whatsoever.

Next, the final value of the contents of the data register is read, as can be seen from FIG. 6; the input at the columns becomes "1011". The value "0" corresponds to the column for which a key has been depressed. The complete value of the data register is "1011 1011"; each 0 indicates a closure of a contact making it possible to identify both the row and the column at once. The microprocessor uses this eight-bit code as a vector for connection with a table memorized in a ROM, which contains the eight-bit code corresponding to the key of the keyboard.

The method described above has the disadvantage of allowing a defrauder who seeks to intervene between the wires joining the keyboard in the interface to identify the depressed key easily. This is all the more problematic when measures have already been taken to protect the information contained in the terminal or device to which the keyboard is connected.

SUMMARY OF THE INVENTION

A first object of the invention is accordingly to propose a method for identifying a key of a non-coded keyboard that does not make it possible to learn what key was depressed.

This object is attained in that the method for garbling the identification of the key of a non-coded keyboard by the scanning technique is characterized in that it comprises:

a) connecting at the output all the rows and columns of the keyboard to the outputs of a first register of a parallel input-output interface by way of one inverter for each output of the register, the output of the inverter being connected both across a resistor to a supply voltage and also to the inputs of corresponding significance of a second register of the interface positioned at the input;

b) connecting all the rows and columns of the keyboard to the inputs of the second register of the input-output interface;

c) randomly setting the order in which the outputs will be scanned;

d) putting at least one of the outputs at 1 and checking whether one of the corresponding inputs is at 1;

e) if not, scanning the remaining lines one by one by placing them each at "1" until the associated input is at the value 1, indicating that the line or column has been found;

f) repeating steps d) and e) to determine the column or line respectively, corresponding to the key of the keyboard that has been depressed.

In a supplementary characteristic, step d) comprises putting two outputs of the output register 160 of the interface 16 and checking whether one of the corresponding inputs of the input register is at 1.

In another characteristic, it is used to protect the information comprising a code number introduced by the keyboard 82 into a bank card reader terminal.

Another object of the invention is to propose a circuit making it possible to perform the method.

This object is attained in that the circuit includes a parallel input-output interface circuit with two registers, each having as many bits as the matrix keyboard has columns and lines, of which the first register is positioned at the output, with each of its outputs connected to an inverter the output of which is connected both across a resistor to a supply voltage and to the inputs of corresponding significance of the second register of the input-output interface positioned at the input; the lines and columns of the matrix of the keyboard are each connected to one input of the second register and one output of the first register, and the parallel input-output interface circuit is connected to the bus of a microprocessor, connected to which is a memory containing the program for performing the method of garbling the identification of the key pressed.

A final object of the invention is to propose a use of the method and the circuit to increase the security of a terminal that receives information from either a microcircuit card or a keyboard.

This object is attained in that the method and the circuit are used to protect the information comprising a multi-digit number introduced via the keyboard into the terminal for reading a microcircuit card, the reading terminal including means for physical protection of the electronic circuits and of the information contained in these electronic circuits.

Further characteristics and advantages of the present invention will become more apparent from the ensuing detailed description, in conjunction with the drawings.

DESCRIPTION OF THE PREFERRED EMBODIMENT

Figure 1:
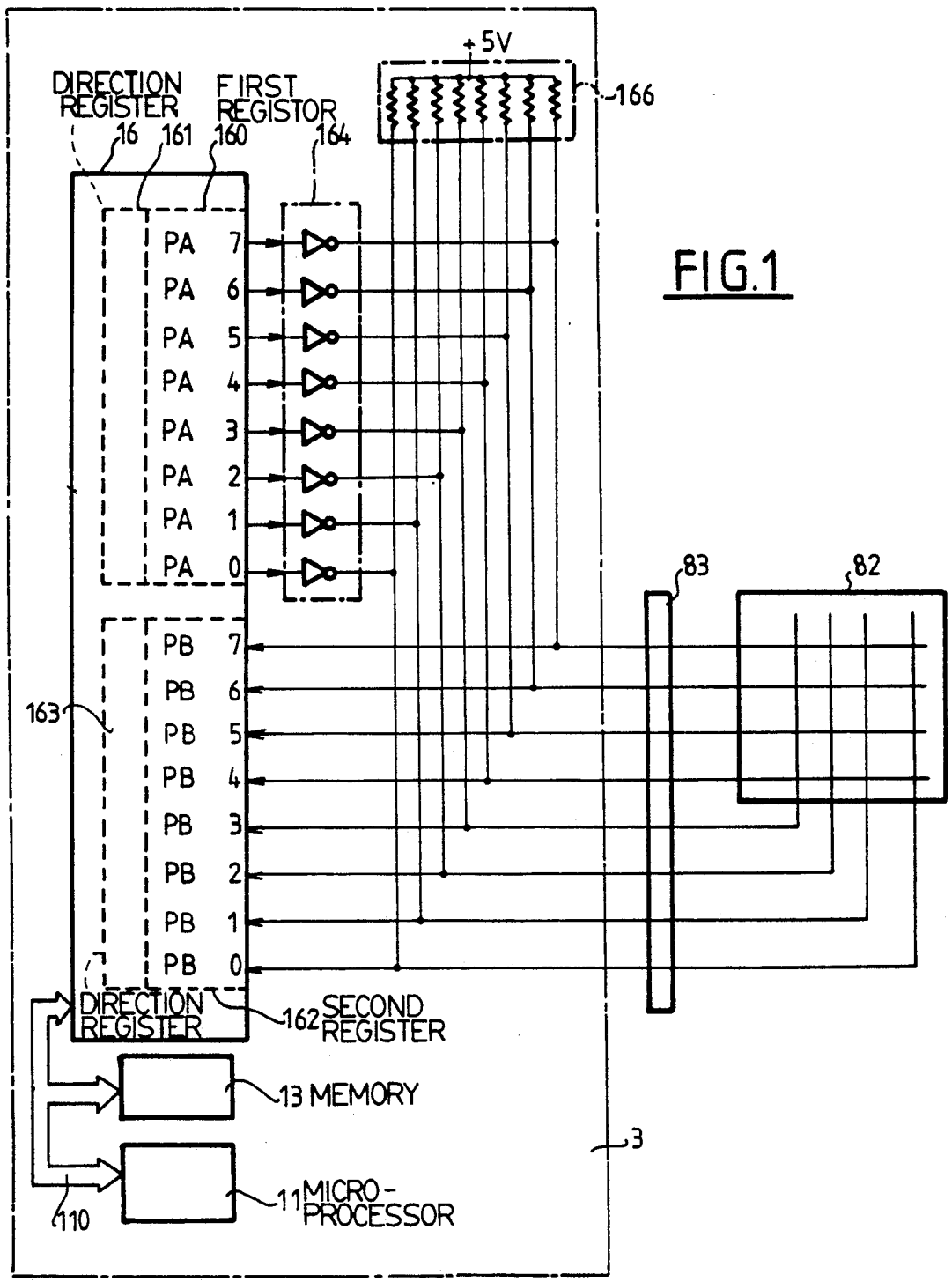
FIG. 1 is a schematic diagram of the principle of the circuit for identifying the key pressed in a non-coded keyboard with which the method of the invention can be performed.

Referring to FIG. 1, an input-output interface 16 is connected by a bus 110 to a microprocessor 11 and a memory 13 that among others also contains the management program for the input-output interface 16 and enables the performance of the method according to the invention. The input-output interface 16 includes a first data register 160, containing one eight-bit byte of data, and its associated direction register 161, which permits the positioning of this data register either at the input or at the output. For the purpose of the invention, the register 160 is positioned at the output. A second data register 162, receiving an eight-bit byte of data at the input, is also associated with its direction register 163, which positions it at the input for the purposes of the operation according to the invention. The data received at the input by the register 162 are then sent to the bus 110 for processing by the processor 11 as a function of the program 130-147 shown in FIG. 2 by way of a flow chart and contained in the memory 13. Similarly, with the aid of the program, the processor 11, via the bus 110, furnishes the data to be transmitted at the output by the register 160. One output PAi is associated with each bit of the eight-bit byte of the output data register 160, and an inverter is connected to this output PAi. The set of eight inverters associated with the eight-bit byte is represented by reference numeral 164. Each inverter output is connected first via a resistor, to a supply voltage and second to the input PBj having the corresponding significance of the input register 162. The set of eight resistors associated with the inverters is represented by reference numeral 166.

The four inputs having the most significance are connected to the four rows of a non-coded keyboard 82, while the four inputs having the least significance of the input register 162 are connected to the four columns of the keyboard 82. It is quite clear that in the context of the invention a non-coded keyboard 82 has been, selected including 16 keys, and consequently having four rows and four columns, but this is in no way limiting, and the invention is applicable regardless of the size of keyboard. It will be sufficient for these purposes either to find an interface with registers of sufficient size or to assign a plurality of interface circuits in parallel. The set of interface circuits 16 and the processors of the signals 11 and 13 are embedded in a resin, as will be seen later, in such a way as to protect them from fraudulent access. The sole possible point of access for a defrauder is the connector 83, which assures the linkage between the interface 16 mounted in a terminal 3 and the keyboard 82, which is connected by a flexible wire to the connector 83.

Figure 2:
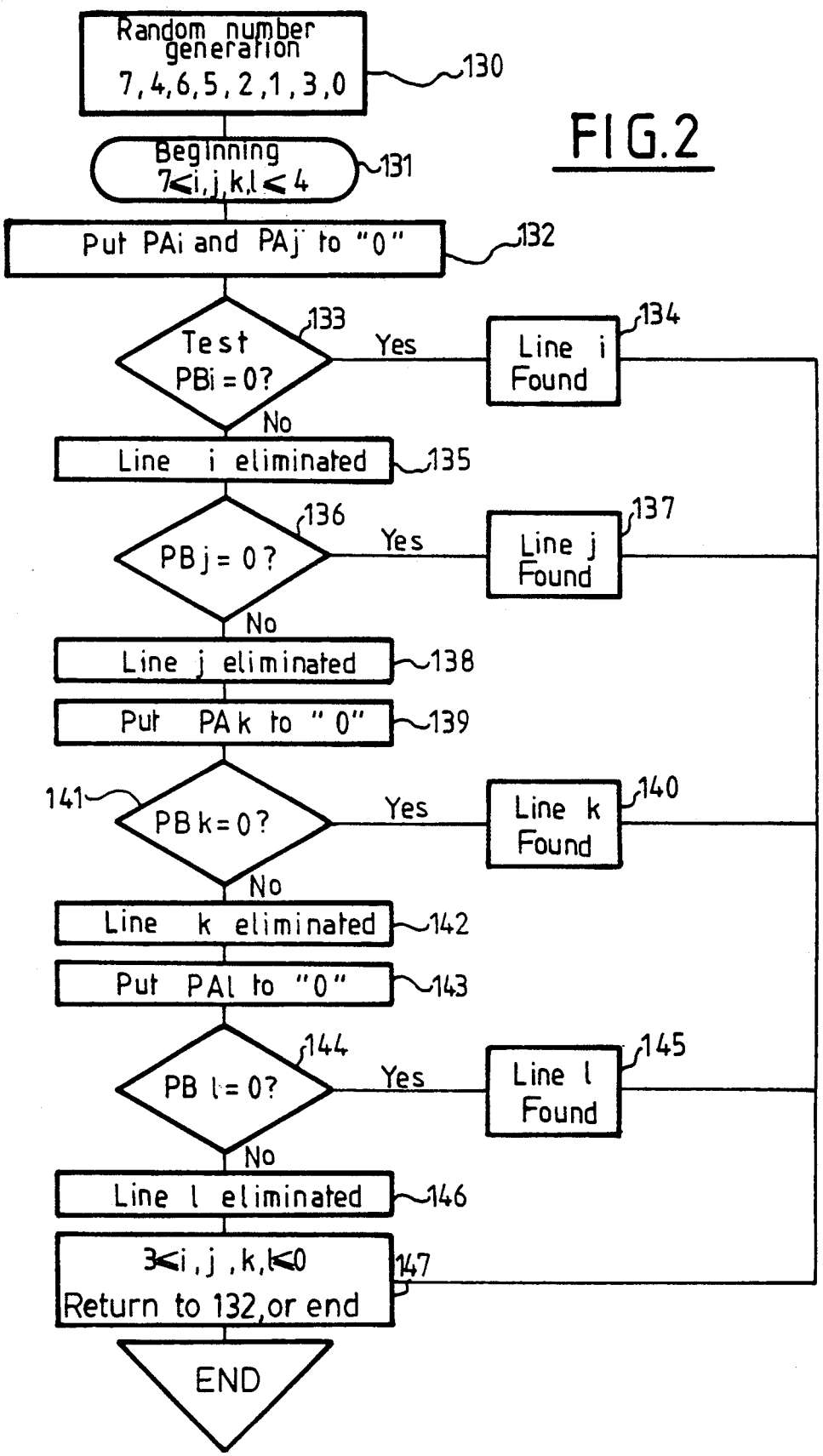
FIG. 2 is a flow chart which shows the steps in the method of identification of the key according to the invention.

The function of the arrangement will now be explained by referring to the flow chart of FIG. 2. A random selection 130, initially for numbers corresponding to the rows and then for those corresponding to the columns, makes it possible to obtain the order in which the outputs of the register 160 are scanned, which in this example will be 7, 4, 6, 5, 2, 1, 3, 0, for instance. Once this random selection has been made, the scanning begins, for example for the lines of the matrix; to do so, step 132 puts the PAj outputs, where i and j are between 4 and 7, at the value "0". In the case of random selection, the first outputs will be PA7, PA4 at the value "0". The other outputs of the register 160 are at the value "1". Thus the word in the register 160 is "01101111", which corresponds to the hexadecimal code 6F. At the output of the inverters 164, a "1" will accordingly be present at line 7 and line 4, and everywhere else there will be zeros. Next, in the following step 133, the input bit of the input register 162 corresponding to the one of the two output lines that has been put at "0" is tested. If this input bit is indeed at "0", in the course of step 134, the software memorizes the fact that the line i has been found. If not, in step 135, the software eliminates line i, and then step 136 tests the bit corresponding in significance to line j, to determine whether its value is "0" or "1". In the case where the value is "0", the software, in step 137, memorizes the fact that the line has been found and its number is j. In the case where the value is "1", the software eliminates this number j as a line number, in step 138, and then proceeds to step 139.

In step 139, another line of the output register is put at "0", while all the others have the value "1", which in the case of the random order indicates above means that line 6 is now at "0". The word in the output register 160 is accordingly "10111111", which in the hexadecimal system is the hexadecimal code "BF". Next, in step 141, the input line of the input register 162 having the significance corresponding to the output line, in this case PB6, is tested, and if its value is "0", then the keyboard line in which the key has been depressed is the one corresponding to the output of the register 160 put at "0". In step 140, the system memorizes the fact that line 6 is at "0" in the case where the key 7 has been touched. In the case where it is not the key 7 that has been touched, the line PB6 is not at "0", and consequently in step 142 the number of the line is eliminated as a possible solution, and the last output corresponding to a line, in this case the output PA5, is put at "0" in step 143. In step 144, the input line of the input register corresponding to the significance of the bit put to "0" is tested, and as a function of the result it is determined whether this line is found or not. As soon as the line has been found in one of the steps 134, 137, 140 or 145, a skip is made to step 147, which returns to the beginning of the flow chart at step 132 after having imposed a requirement that the subscripts i, j, k, l remain between the values "0" and "3", in such a way as to scan the columns. The flow chart is resumed for the values i, j, k, l included between 0 and 3 in such a way as to sweep the columns, and thus in step 132, taking into account the random selection performed, PA2 and PA1 are positioned at "0". This now provides the output register with the word "11111001", which in hexadecimal code is the value "F9".

In step 139, PA3 is positioned at "0", which at the output register gives the value "11110111", corresponding to "F7" in hexadecimal.

In step 143, PA0 is given the value of "0", giving the output register the value "11111110", corresponding to hexadecimal "FE". In the case where it is assumed that the key 7 has been depressed, the software will determine in step 137 that it has found the column corresponding to the input PB1. Consequently, with PB6 and PB1 known, it is possible to determine that the key 7 has been depressed. In the case of the key 7, the steps following step 136 will not be executed, and a skip is made directly to step 147 for the determination of the column. In the case of determination of the line, the skip is made from step 140 to step 147. After that step, either a return to the beginning of the program at step 132 is made, or the program is stopped, if both values have been found.

A defrauder plugged in at the connector 83 obtains the following information. At the time of row scanning, in the first step he sees lines 7 and 4 of the matrix corresponding to the inputs PB7 and PB4 that are at "1", which might possibly give him the information that these lines are not the ones. Next, in the following step, he sees that line 6 corresponding to the input PB6 is at "0", as are all the others, which in this case gives him no information whatever. The system, which has determined that the line was the second line, then passes directly to scanning the columns. Taking into account the random selection, it begins to scan columns 3 and 2, corresponding to the inputs PB2, PB1, respectively. In that case, the defrauder will read the input word "00000100", since the value "0" which is found on line PA6 at the output of the inverter will be transmitted by the matrix of the keyboard and the key 7 depressed to the input PB1, and it is this value that the defrauder will take for the value PA1. Consequently, the defrauder can deduce only that the column 3 is not involved. On the contrary, the system knows that it is the key 7 that is involved. At this stage, the defrauder is still uncertain about keys 5, 7, 8, 9, 11 and 12, and this uncertainty does not permit him to learn the key. Since the code of a bank card comprises four digits, the uncertainty he has with only one key becomes increasingly complicated with four digits.

If the value PF(n) is calculated, representing the probability that requires the program associated with the microprocessor to perform n steps or strokes to find the key, it will be appreciated that in the case of the method described above, with line or column scanning of two lines or two columns in the first stroke, the following values are obtained: $PF(1)=0$, $PF(2)=PF(3)=4/16$, $PF(4)=5/16$, $PF(5)=2/16$, $PF(6)=1/16$. Consequently, the probability of finding the key is greatest at the end of 2, 3 or 4 strokes. Even if it is found at the end of four strokes, this leaves an uncertainty of at least 3 keys for this key in question. As for the other keys of the code, one can find them in two or three strokes, but the uncertainty about the code remains sufficiently great to prevent a defrauder from determining the code.

The fact that more than one output of the register is put at the value "1" is important from two points of view. First, this improves the probabilities, and second, it increases the difficulty for the defrauder, because he will sometimes find two "1s", sometimes a single "1", or even no "1" sometimes, depending on whether the scanning was done with one "1" or with two "1s". If the above probabilities are compared with those for finding the key by using the same method but performing scanning of one output at a time, the following probabilities are obtained: $PF(1)=0$, $PF(2)$=probability of finding the line at the first stroke multiplied by the probability of finding the column at the stroke=$\frac{1}{4}\times\frac{1}{4}=1/16$, $PF(3)=2/16$, $PF(4)=3/16$, $PF(5)=4/16$, $PF(6)=3/16$, $PF(7)=2/16$, and $PF(8)=1/16$. Hence it is confirmed that if high probability is desired, it is necessary to use from four to six strokes, which further lessens the uncertainty for the defrauder. It is quite apparent that the method is not limited to the scanning beginning with the lines. Scanning can certainly begin instead with the columns, consequently modifying the random selection.

This type of protection is particularly useful in the case where the keyboard is used with a terminal protected by the embodiment shown in FIGS. 3-5, which will now be described below.

Figure 3:
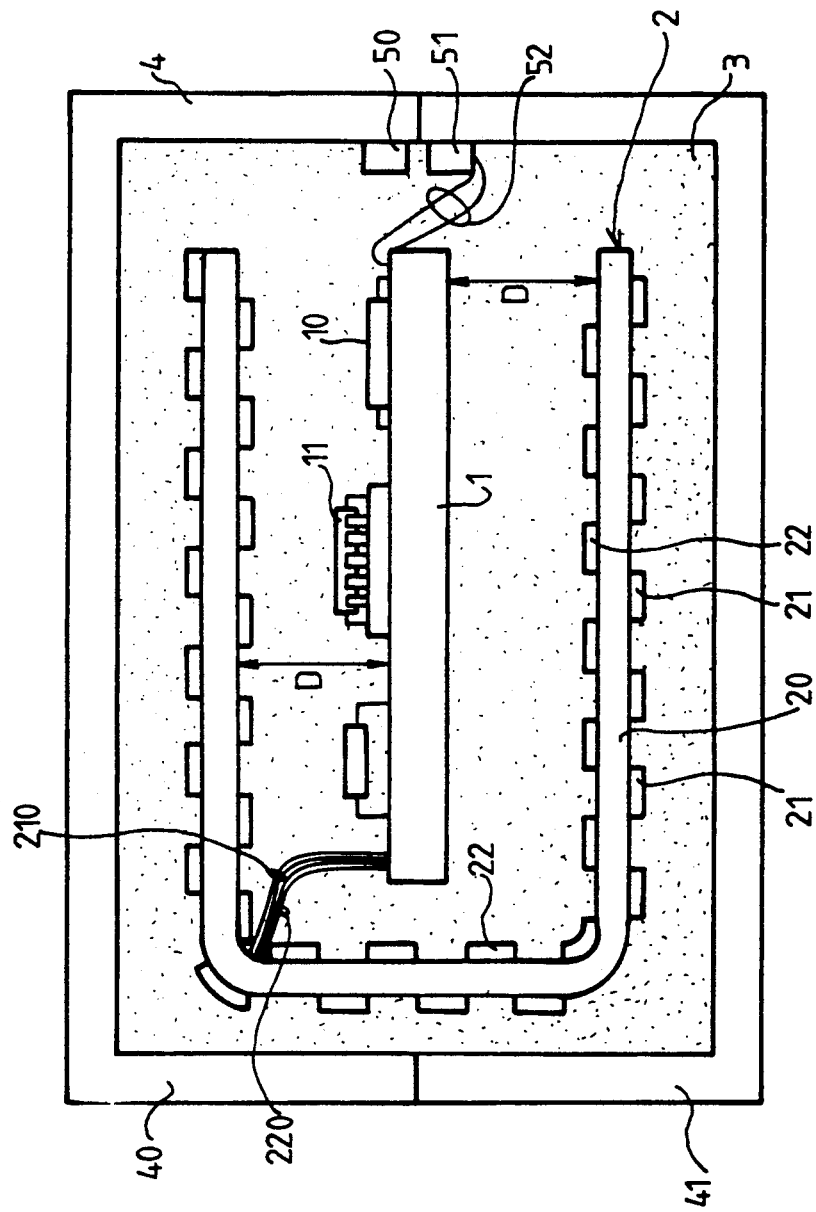
FIG. 3 is a schematic diagram in section showing an arrangement for physical protection for an electronic card of a terminal.

Referring to FIG. 3, there is shown a card 1 including a set of electronic circuits 10, 11 surrounded by a resistor network 2 comprising a polycarbonate film 20. A carbon film 21, 22 is printed on each of the faces of film 20 by screenprinting. As can be seen from FIG. 3, the carbon tracks 22 on one face of the polycarbonate film are staggered with respect to the tracks 21 of the other face of the substrate film 20.

The set of these carbon film networks 22 and 21 deposited on each of the faces comprise a first resistor R1 and a second resistor R2, respectively, which are connected to the electronic circuit of the card 1 by a first and second linkage 220 and 210, respectively. The set comprising the electronic card 1 and resistor network 2 is embedded in the polyurethane resin. This resin remains in the solid state up to a temperature of approximately 100° C. The distance D between the faces of the resistor network and the printed circuit comprising the electronic card is reduced to a sufficient extent to preclude sliding of a probe of a measuring instrument between the resistor network 2 and the electronic circuit card 1 via the faces where, because of the U cross section of the resistor network 2, the card is not surrounded.

In an improved embodiment, it would be conceivable to surround the card with four resistor networks disposed in such a way that no open interval whatever allows access to the electronic card 1.

The resin block 3 is then enclosed in a package 4 comprising two half shells 40, 41. The first half 40 includes a magnet 50 in proximity with the separation surface, and the second half 41, adjacent to the separation surface, includes a switch 51 with a flexible blade, which is connected by wires 52 to the electronic circuit of the card 1.

Figure 4:
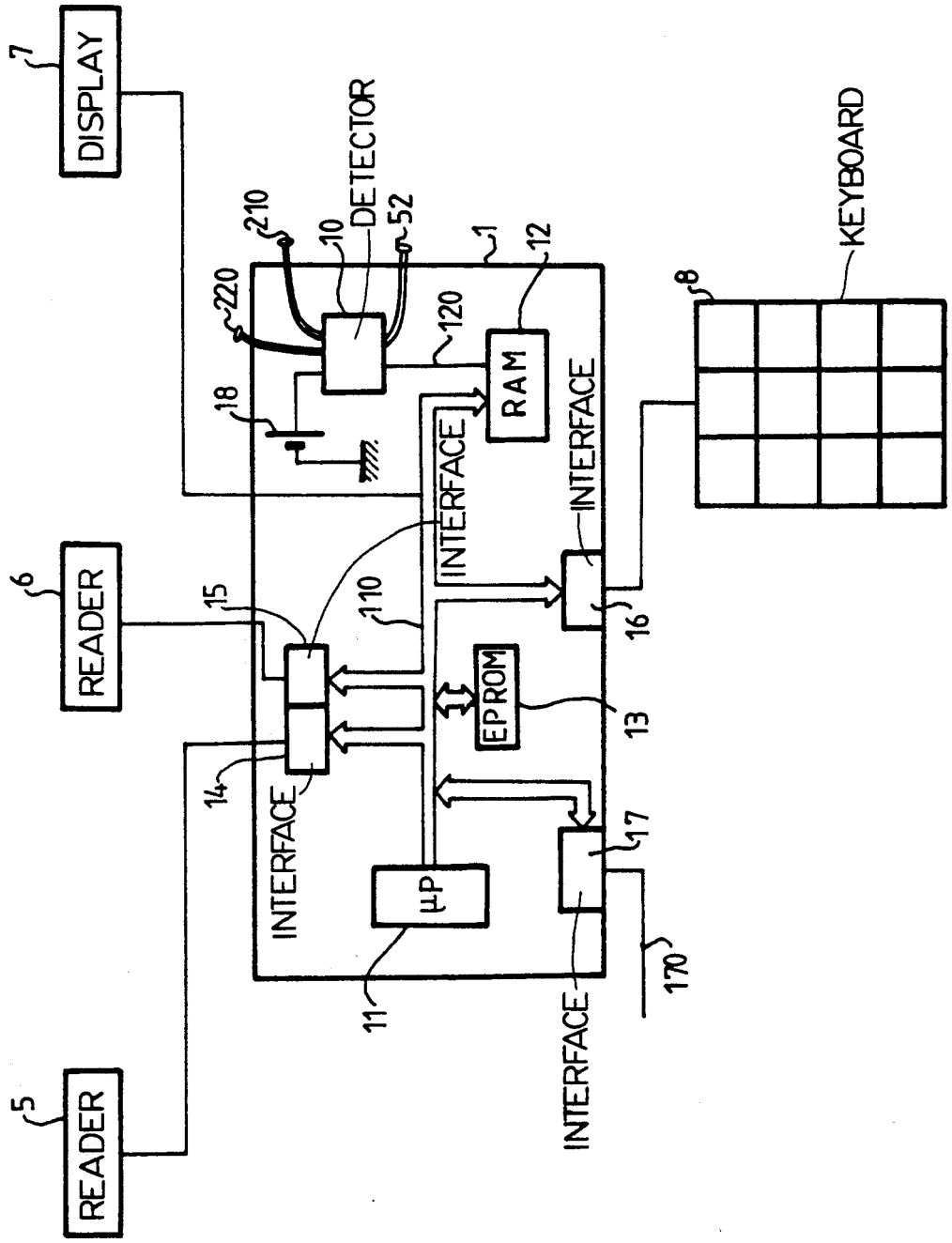
FIG. 4 is a diagram showing the functional elements.

FIG. 4 shows a practical application of the principle of the invention according to FIG. 1, particularly for protecting a credit card reading terminal. This credit card reading terminal shown in FIG. 4 includes a magnetic track reader 6 connected via an interface circuit 15 to a bus 110, to which a microprocessor 11 is connected. A second reader 5 is adapted for reading credit cards, including, in addition to the magnetic track, a circuit that is integrated with an autoprogrammable microprocessor. This reader 5 is connected by a second interface 14 to the bus 110. A display device 7, for example comprising light emitting diodes, is also connected to the bus 110. A volatile memory 12 is also connected to the bus 110. This volatile memory 12 (or RAM) is transformed into a nonvolatile memory by a battery 18 or a lithium cell, which makes it possible to assure the power supply to the volatile memory even in the case where a main or auxiliary power system is cut off. This power supply 18 to the volatile memory is transmitted via an electronic circuit 10 for detecting attempts at fraud, and the electronic circuit 10 is connected by the wires 220, 210 and 52 both to the resistors of FIG. 3 and to the flexible blade switch 51. Similarly, a keyboard 8 is connected to the bus 110, by way of an interface circuit 16. Finally, a programmable read-only memory of the EPROM type is connected to the bus 110. The terminal also includes an interface circuit 17 enabling the establishment of either a linkage of the RS 232 type or a local area network.

Figure 5:
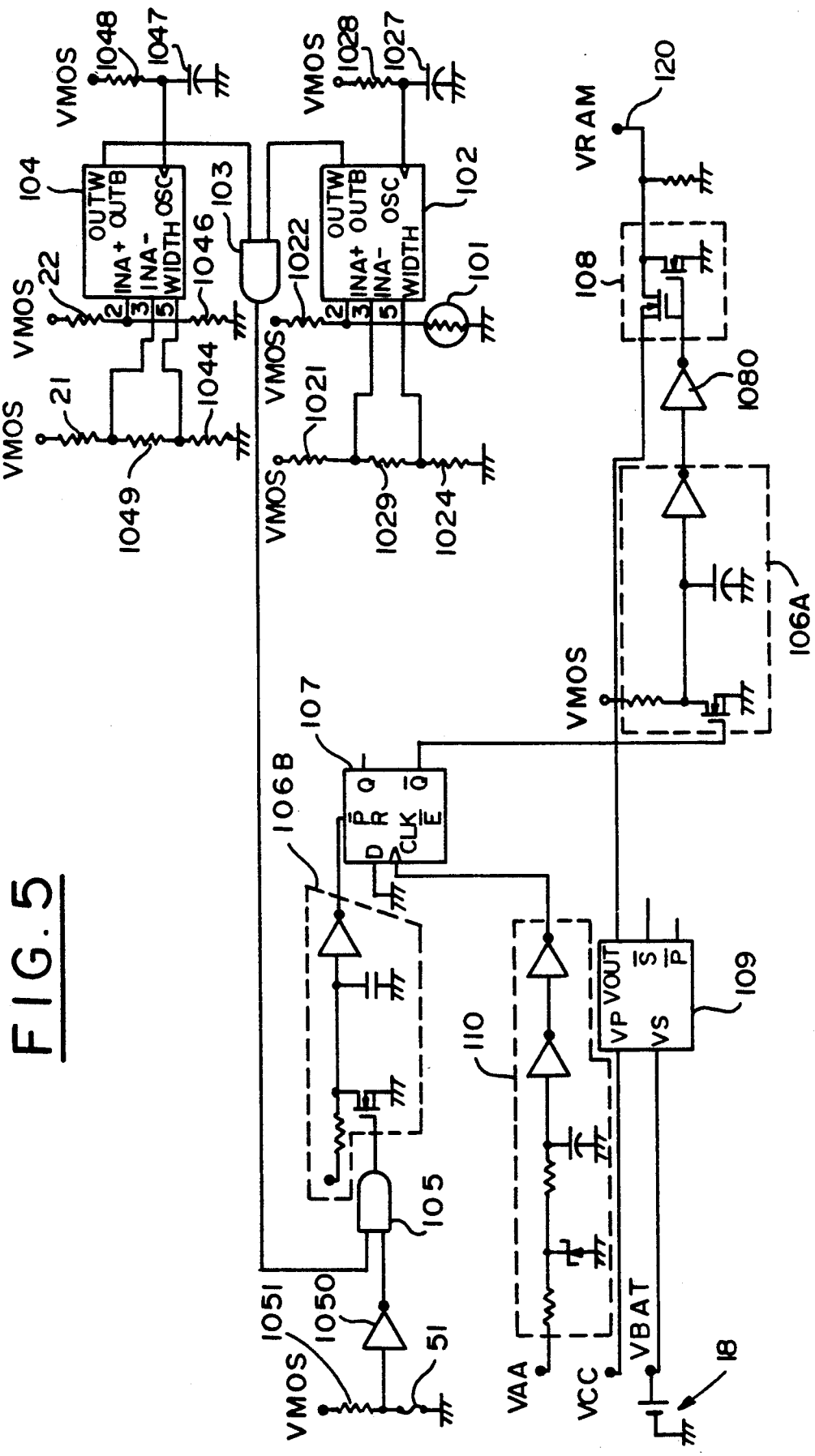
FIG. 5 is the electronic diagram of the arrangement for protecting the electronic volatile memory circuit of the terminal.
Figure 6:
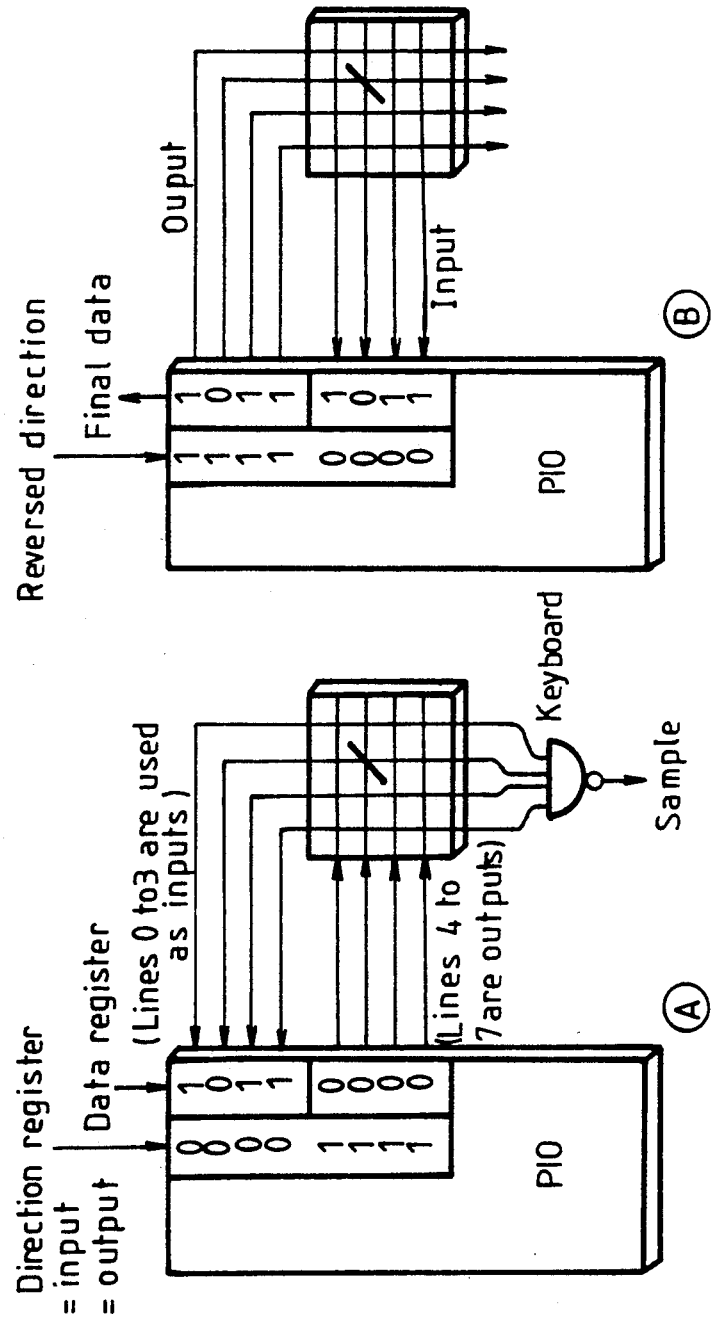
FIG. 6 shows the electronic circuit for identifying a key pressed for a non-coded keyboard, according to the prior art.

The electronic circuit 10 for protecting the card 1 from fraud is shown in FIG. 5. This electronic circuit includes a thermistor 101 mounted in a bridge comprising the resistors 1022, 1021, 1024 and 1029. The bridge is connected to the input of a window comparator 102, which at its clock input OSC receives the signal furnished by a pulse generator, comprising the common point of a resistor 1028 and a capacitor 1022, which are connected in series between ground and the supply voltage. The output of the comparator 102 is sent to a first input of an AND gate 103. The second input of this AND gate 103 receives the output of a second window comparator 104, which at its pulse input receives the signal furnished by the common point of a resistor 1048 and a capacitor 1047, which are connected in series between the supply voltage and ground. This comparator 104 is connected to a resistor bridge comprising on the one hand the resistors 21, 22 of the network surrounding the circuit and on the other the resistors 1046, 1044 and 1049. The output of the AND gate 103 is sent to a first input of a second AND gate 105, a second input of which receives the output of an inverter 1050. This inverter 1050 has its input connected to the common point between a resistor 1051 and the flexible blade switch 51, which are connected in series between supply voltage and ground. The output of the AND gate 105 is sent via a filter 106b to a multivibrator 107, the clock input CLK of which receives the output of an oscillator 110. The /Q output of the multivibrator 107 is sent to a second filter 106a, the output of which is connected to an inverter 1080. The output of this inverter controls an electronic switch circuit 108 making it possible to cut the output 120 that supplies the volatile memories 12 of the card 1. The power supply for these memories is furnished by a power switching circuit 109, enabling the automatic switching of the power of the terminal to a supply system furnished by the lithium cell 18 connected to the VS input of the circuit 109.

In operation, the thermistor 101 associated with the comparator 102 makes it possible to detect the crossing of the two temperature thresholds, which are −30° C. and +100° C. The 30° C. threshold makes it possible, when the temperature of the electronic circuit is being lowered, to make it impossible to disconnect the battery without losing the information contained in the volatile memories 12. That would permit a defrauder to gain access to the information, represented by the keys of the clients who have used their cards, contained in the volatile memories 12. Likewise, the +100° C. threshold makes it possible to detect an attempt at melting the resin 3 with a view to gaining access to the information contained in the volatile memory. In both cases, where either of these temperature thresholds is crossed, the circuit cuts off the power to the volatile memory RAM and in this way causes the destruction of the information contained in it.

Similarly, any attempt at piercing the resistor network 21, 22 is revealed by the corresponding variation in the resistances of the resistors 21, 22 detected by the comparator 104, the output of which controls the cutoff of the power to the memory 12. Piercing of a channel to introduce a measurement probe, and thus sample the information contained in the memory, can be prevented in this way. Finally, the opening of the package of the terminal is detected by the flexible blade switch 51, the contact of which closes as soon as the magnet 50 is moved away from this switch. This situation is detected by the inverter 1050 and transmitted by the AND gate 105 to the multivibrator 107, the output of which controls the cutoff of power to the volatile memory 12. The multivibrator 107 enables memorization of one of the three detection states as soon as one of these three conditions appears, or as soon as two or three such states appear at the same time.

In this way, a protection arrangement for a terminal is achieved which makes it possible to prevent attempts at fraud, either at the keyboard or in the terminal.

Any modification within the competence of one skilled in the art is also possible without departing from the spirit and scope of the invention.

What is claimed is:

1. A method for identification of the actuated key of a non-coded keyboard matrix (82) by a scrambled scanning technique comprising:
   a) connecting each row and column of the keyboard matrix to an individual output of an output register (160) of a parallel input-output interface (16) by way of one inverter from a set of inverters (164) for each output of the output register (160), each output of each inverter being connected via one resistor from a set of resistors (166) to a voltage supply;
   b) connecting each row and column of the keyboard to an individual input of an input register (162) of the parallel input-output interface;
   c) randomly determining the order in which each output of the output register (160) will be scanned;
   d) setting two outputs of the output register (160) which have been randomly determined to be scanned first at a first of two logical values, and maintaining the remaining outputs of the output register (160) at a second logical value which is inverse of the first logical value, and testing whether the input of corresponding bit significance of the input register (162) is at the inverse value;
   e) setting in a memory the results of said testing when the corresponding input of the input register (162) is at the inverse logical value;
   f) thereafter successively scanning in said randomly determined order the remaining outputs of the output register (162) by setting one remaining output of the output register at the first logical value and testing and memorizing if the corresponding bit input of the input register (162) is at the inverse logical value; and
   g) repeating steps f) until all outputs of said output register have been scanned to determine the row and column corresponding to the actuated key of the keyboard using the results from said said successive testing and memorizing steps, thereby effecting the identification of said actuated key.

2. The method as defined by claim 1, wherein at step d) said two outputs of the output register (160) corresponding to rows of said matrix are set at the first logical value and at step f) said remaining outputs correspond to remaining rows of said matrix, and including a further step h) wherein step d) is repeated for columns of said matrix and step f) is repeated for remaining columns of said matrix.

3. A method as defined by claim 1, further comprising identifying more than one key actuation to identify a multi-digit code number by iterating said key identification steps, and introducing said code number into a bank card reader terminal thereby protecting said code number.

4. A method as defined by claim 2, further comprising identifying more than one key actuation to identify a multi-digit code number by iterating said key identification steps, and introducing said code number into a bank card reader terminal thereby protecting said code number.

5. A circuit for identification of the actuated key of a non-coded matrix keyboard (82) by a scrambled scanning technique comprising:
   a) a parallel input-output interface (16) having output and input registers (160, 162), each register having as many bits as the keyboard has columns and rows, of which one register (160) is disposed as an output register with each of its outputs individually connected to an input of one inverter from a set of inverters (164), and the other register (162) is disposed as an input register;
   b) means for connecting the individual outputs of said inverters via one resistor from a set of resistors (166) to a voltage supply, and further to the input of corresponding bit significance of the input register;
   c) means for connecting each row and column of the keyboard to one input of the input register (162) and to the output of corresponding bit significance of the output register (160) by way of the inverters;
   d) a microprocessor (11) connected via a bus (110) to the interface (16); and
   e) a memory (13) containing a program for management and control of the interface (16) by the microprocessor (11) for implementing the scrambled scanning technique and thereby identification of the actuated key of the non-coded keyboard.

6. The circuit as defined by claim 5, further comprising a reading terminal having means for physical protection of information contained in the circuit for identification, said terminal adapted for reading a microcircuit card, said information comprising a multi-digit number introduced via said keyboard into said terminal.

7. The circuit as defined by claim 6, wherein the means for physical protection comprises a resistive network (21, 22) embedded in a resin (3) and further including means (104) for detecting modifications to the resistance of the network and means (101, 102) for detecting variations in the temperature of the resin.

* * * * *